Jan. 17, 1961     A. L. CAMP     2,968,313
AUTOMATIC DIVERTER VALVE
Filed Aug. 11, 1958
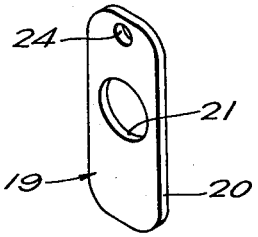
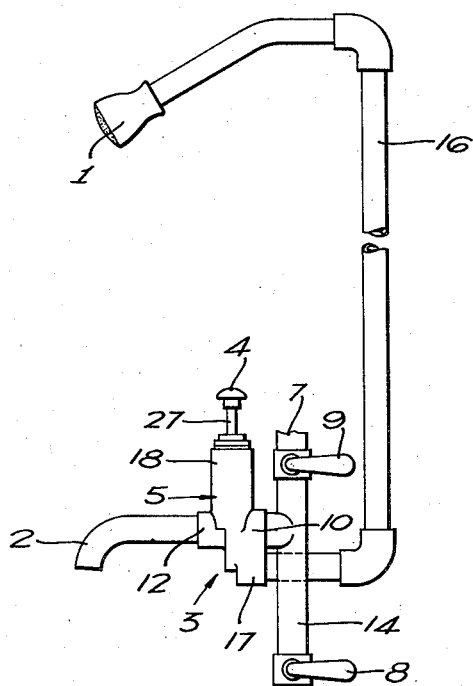
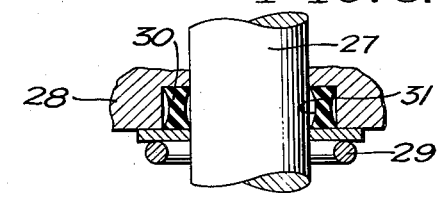
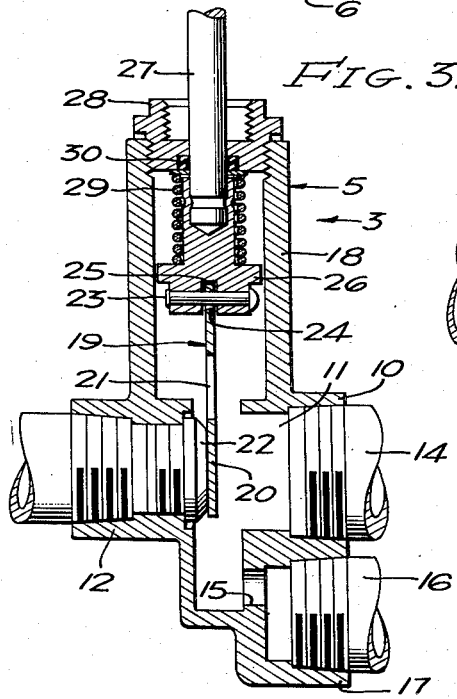
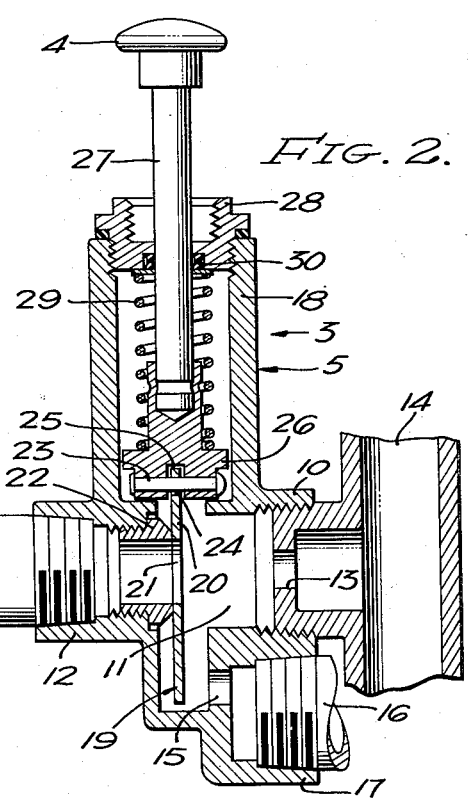
INVENTOR.
ALFRED L. CAMP
BY
ATTORNEYS United States Patent Office 2,968,313
Patented Jan. 17, 1961

2,968,313

AUTOMATIC DIVERTER VALVE

Alfred L. Camp, Brea, Calif., assignor to Repcal Brass Mfg. Co., Los Angeles, Calif., a corporation of New Jersey Filed Aug. 11, 1958, Ser. No. 754,399

8 Claims. (Cl. 137—467)

This invention relates to an automatic diverter valve, and more particularly to a diverter valve of the type that is generally employed between a shower head and a spout fixture for utilizing the flow of water between the said fixtures.

This application is a continuation-in-part of my application heretofore filed May 28, 1957, Serial No. 662,231, now abandoned. Automatic valves are extensively employed for diversion of water from a spray fixture to a spout fixture where the flow of water is normally through the spout but is diverted to the spray fixture as a shower through the actuation of a valve means in such fixtures and a device is usually employed by creating a reduced pressure in a position to avoid the flow of water to the spray fixture or showerhead when the water is flowing through its normal course, i.e., through the spout.

This application is further directed to an improvement in the diverter valves shown and described in the Bowlzer Patent No. 1,763,877 issued June 17, 1930, and the Fredericks Patent No. 2,115,628 issued April 26, 1938. Most of the diverter valves employed for utilizing a combination fixture in which there was a valve element usually located in or controlled through the spout so as to interrupt the flow of water to or through the spout, and this valve element has been of the type similar to a check valve in that the pressure of the water flowing through the system holds the valve closed so that on cessation of flow through the fixture the valve will open and return the system to normal operation, i.e., flow of water through the spout at the same time permitting the elevated spray and the pipes leading thereto then drain back through the spout. This has necessitated the construction of special spouts and has resulted in a somewhat expensive form of diverter valve.

It is the object of this invention to produce a diverter valve for use in such a system in which all elements required for the operation in the diverter valve and for effecting the diversion of the water therein are mounted within an integral housing and wherein the device is so constructed in such integral housing as to make construction, maintenance and installation of the diverter valve less costly.

Another object of this invention is to provide a diverter valve which includes a simplified form of diverter mechanism in which the mixing chamber, or flow chamber of the diverter valve is of simplified form and water under pressure within the chamber acts both to maintain the diverter valve element in water diverter position and likewise acts to increase the resistance to movement of the diverter element away from its diverting position.

Other objects and advantages of this invention will be apparent from the following detailed description of preferred embodiments thereof when read in connection with the accompanying drawings.

In the drawings:

Figure 1 is a side elevation view of the spout and spray fixture combination employing a diverter valve and illustrating the same in position in a wall.

Figure 2 is a sectional side elevation view of the diverter valve embodying my invention, illustrating the valve in spout flow position.

Figure 3 is a side elevation in section similar to Figure 1, by illustrating the diverter valve actuated to position to divert the water from the spout to the spray.

Figure 4 is a view of the valve plate embodied in my invention.

Figure 5 is an enlarged sectional view of the low pressure sealing ring employed in my invention.

In Figure 1 in the drawings I have illustrated diagrammatically the combination spout and spray fixture of a typical form which includes a spray fixture at 1 which is in an elevated position with respect to a spout 2, and the spout 2 being normally employed for filling a tub, basin or the like, and the spray fixture 1 being either a showerhead or other spray fixture which may be either permanently positioned or may be on a conduit which permits application of spray at the point desired, for example, of a basin for washing hair, or the like, or the spout 2 may be a sink spout and the spray, which may be a spray used for rinsing or washing dishes in a sink. The diverter valve generally indicated at 3 is constructed between spray fixture 1 and spout 2 so as to deliver water selectively to the spout or spray fixture as desired by the actuation of the valve mechanism through the exposed handle actuator 4. A vertically extending valve housing 5 and diverter branch 18 form a pair of connected chambers, the lower chamber 11 being substantially unobstructed, and the upper chamber being adapted to receive an operating means for a diverter valve, as described hereinafter. Normally water is delivered into the housing 5 of the diverter 3 from hot and cold water supplies generally indicated at 6 and 7, the water being controlled from the supplies by means of valves 8 and 9, or through the medium of a single mixing valve. The water admitted from the supplies 6 and 7 enters the inlet branch 10 of the housing 5 into the lower chamber 11 therein which serves as a mixture chamber when hot and cold water are admitted into the branch 10 and normally flows from the mixing chamber 11 through the spout outlet branch 12 of the housing and through the spout 2 to the tub, lavatory or basin. In order to produce an ejector effect within the mixing chamber 11 the flowing water passes through a reduced passage or nozzle 13 which may be either formed in the supply fitting 14 or could be formed directly within or mounted as a separate part in the inlet branch 10. The water thus flowing through the reduced opening or nozzle 13, across the lower chamber 11 and out the spout branch 12 produces an ejector effect across the reduced spray fixture outlet opening 15 which will tend to drain any water standing in and draw air in through the spray fixture pipe 16 which is threaded into the spray fixture outlet nipple 17 of the housing 5. Extending vertically from the housing 5 is the diverter branch 18 forming the upper chamber in which the diverter valve generally indicated at 19 is mounted in position with relation to the water passage through the spout outlet branch 12.

The diverter valve employed may be of any suitable or desirable construction but its preferred form is illustrated in the drawing and consists of an apertured valve plate 20 having a passage 21 formed therethrough which is normally in position to register with a port formed through a seat nipple 22 which is threaded within the spout outlet branch 12 from the interior of the housing. The seat nipple 22 thus provides a removable valve seat which is mounted within the housing 5 through the inlet branch 10. The valve plate 20 of the diverter is an elongated rectangular plate of sufficient length to provide an imperforate section forming a closure plate when the diverter valve actuating handle 4 is moved upwardly (Fig.

3) to move the plate to close the seat provided by the seat nipple 22. In this position water static pressure and jet pressure within the unobstructed chamber 11 hold the valve plate 20 in position to close the water passage to the spout outlet branch 12, diverting flow of water, with a minimum flow resistance, through the spray outlet 15 up through the conduit 16 to the spray fixture or showerhead 1 as long as water pressure remains within the chamber 11. It is intended the valve plate 20 will be maintained in closed position and as soon as the pressure of the water under pressure into the chamber 11 is stopped, the valve plate 20 will automatically move back out of diverting position (Fig. 2) to the position where the plate aperture 21 registers with a passage through seat nipple 22 permitting water flow out of the spout 2 to drain through conduit 16 or to elevated spray fixture 1.

The valve plate 20 is mounted so as to be self adjusting to its seat position and in a manner to be actuated to diverting position so that it will return to non-diverting position automatically on cessation of flow. In order to accomplish this result the valve plate 20 is mounted upon a supporting pin 23. Pin 23 passes through an enlarged aperture 24 formed in the upper end of the plate 20 and is positioned within a recess 25 formed between a pair of forks in the valve head 26 so that the same is free to flutter and thus adjust itself to its seat. The opening 25 in which it is mounted is of sufficient size as to permit plate 20 to oscillate within the opening because of the enlarged aperture 24. The pin 23 is inserted in the head 26 through the opening 24. The head 26 is of smaller diameter than the diverter branch 18 so as to have clearance so that it may still act as a guide in longitudinal movement through the branch 18. The head 26 is secured to a stem 27 upon which the actuating knob of handle 4 is secured. A plug 28 is threaded in the diverter stem 18 at its upper end and a spring 29 is mounted between the plug 28 and the head 26 and acts to urge the diverter valve to non-diverting position. In order to provide packing means for the packing of the stem 27 in the plug 28, I prefer to employ a packing ring 30 which is of the low pressure seal type and is illustrated in Figure 5. This ring is in the form of a modified O-ring having concave sealing faces as illustrated at 31 so that the same provides a seal at low pressures and also provides at low pressures a resistance to the passage of the stem 27 therethrough, thus aiding in retaining the diverter valve in the diverting position where the water is required to flow through the spray outlet 15.

Under normal flow conditions, water pressures normally existing in water supply pipes, it is found preferable to maintain a relationship between the inlet 13, the spout outlet provided through the seat element 22 and the spray outlet provided at 15. Inlet 13 is of a restricted size, smaller than the spout outlet through the seat element 22 but it may be somewhat larger than the spray outlet 15. A suitable ratio, although not critical and dependent upon the pressure, is to have the inlet 13 of the diameter of 5/16 of an inch where the spout outlet through the seat 22 is approximately ½ inch in diameter and the spray outlet is ¼ of an inch in diameter.

As shown in Figure 3, the valve plate 20 is manually moved to diverter position so that the outlet through the seat element 22 is closed and the plate 20 is held in position by the force of the jet from the nozzle 13 and the static pressure of the water within the chamber 11, and the tendency of the spring 29 to move the plate out of this diverting position is resisted, even under low pressure, by the low pressure sealing ring 30 which adds sufficient resistance to the movement of the stem 27 and acting in conjunction with the pressure of the water against plate 11, holds the plate 20 in a diverting position.

Having fully described my invention, it is to be understood that I do not wish to be limited to the details herein set forth, but my invention is of the full scope of the appended claims.

I claim:

1. In a diverter valve, a vertically extending valve housing having a relatively unobstructed lower chamber and an upper chamber connected with the lower chamber, said lower chamber having an inlet and a pair of outlets, a stem slidably mounted for vertical, longitudinal movement in said upper chamber, a flat diverter plate within the housing, and means connecting said plate with said stem to move said plate longitudinally in said chambers and to move freely toward and away from one of said outlets, the plate having an aperture permitting flow from the inlet through said one outlet and having an imperforate section obstructing flow through said one outlet, said stem being operable for moving said plate to a diverting position to obstruct said one outlet, diverting the flow from the inlet through the the other of said outlets.

2. In a diverter valve, a vertically extending valve housing having a relatively unobstructed lower chamber and an upper chamber connected with the lower chamber, said lower chamber having an inlet and a pair of outlets, one of said outlets being adjacent to and coaxially aligned with the inlet, a stem slidably mounted for vertical, longitudinal movement in said upper chamber, a flat valve plate within the housing, and means connecting said plate with said stem to permit said plate to have freedom of limited swinging motion toward and away from said axially aligned outlet, said plate having an aperture permitting flow from the inlet through said aligned outlet in one position and having an imperforate section which, in another position of the plate, seats against said aligned outlet and is held thereagainst by pressure within the housing causing the flow to be diverted from the inlet through the second outlet, and a spring, cooperable with the stem, urging the plate toward said one position.

3. In a diverter valve, a vertically extending valve housing having a relatively unobstructed lower chamber and an upper chamber connected with the lower chamber, a pair of axially aligned openings connected to said lower chamber, one of said openings comprising a relatively restricted inlet and the other of said openings comprising a relatively unrestricted outlet, and a second outlet connected to said lower chamber so that flow from said inlet through said axially aligned outlet is in the form of a jet which produces within the chambers a zone of reduced pressure whereby flow will not pass through the second of said outlets, a flat plate within said chambers having a passage therethrough and an imperforate portion, said plate being movable between a non-diverting position in which the plate lies within the lower chamber and a diverting position in which only said imperforate portion lies within said lower chamber, means in said upper chamber mounting said plate to move longitudinally in said chamber and to have limited swinging motion toward and away from said axially aligned outlet, whereby the jet from the inlet strikes the imperforate section of the plate when in its flow diverting position to retain the plate seated on said axially aligned outlet, and flow is diverted to said second outlet when the plate is in its diverting position, and means for urging the plate out of diverting position to its non-diverting position when flow from the inlet to the second outlet is interrupted.

4. In a diverter valve the combination of: a vertically extending valve housing having a relatively unobstructed lower chamber and an upper chamber connected with the lower chamber, said lower chamber having an inlet and a pair of outlets, a flat plate having an imperforate section and a section having an aperture therethrough, means in said upper chamber for moving said plate with respect to one of said outlets to align said aperture with said outlet, means in said upper chamber urging said plate to the position wherein said aperture is aligned with said one outlet, and a low pressure seal surrounding said moving means whereby water pressure on said seal and upon said imperforate section overcomes said urging means, means mounting said plate upon said moving means to have limited swinging movement with respect thereto toward and away from said one outlet to permit self-aligning of said plate.

5. In a diverter valve the combination of: a vertically extending valve housing having a relatively unobstructed lower chamber and an upper chamber connected with the lower chamber, said lower chamber having an inlet and a pair of outlets, a flat plate having an imperforate section and a section having an aperture therethrough, a stem in said upper chamber, axially aligned with said plate, said stem having a forked lower extremity, said forked extremity providing a recess wider than the thickness of said plate, a pin extending between said forks and a hole in said plate, the hole in said plate being larger than said pin permitting limited movement of said plate relative to one of said outlets to align the imperforate section with said one outlet when liquid is introduced through said inlet, and means in said upper chamber urging said plate to a position wherein said aperture is aligned with said one outlet.

6. In a diverter valve the combination of: a vertically extending valve housing having a relatively unobstructed lower chamber and an upper chamber connected with the lower chamber, said lower chamber having an inlet and a pair of outlets, a flat plate having an imperforate section and a section having an aperture therethrough, a stem in said upper chamber, axially aligned with said plate, said stem having a forked lower extremity coaxial with the longitudinal axis of the plate, a pin extending between said forks and a hole in said plate, the hole in said plate being larger than said pin and the space between the forks being greater than the thickness of the plate, permitting limited movement of said plate toward and away from one of said outlets to align the imperforate section with said one outlet when liquid is introduced through said inlet, and means in said upper chamber urging said plate to a position wherein said aperture is aligned with said one outlet, said one outlet being larger than said inlet and adjacent thereto and axially aligned therewith so that flow through same creates a zone of reduced pressure preventing flow through the other outlet.

7. In a diverter valve the combination of: a vertically extending valve housing having a relatively unobstructed lower chamber and an upper chamber connected with the lower chamber, said lower chamber having an inlet and a pair of outlets, a flat plate having an imperforate section and a section having an aperture therethrough, a stem in said upper chamber, axially aligned with said plate, said stem having a forked lower extremity within said upper chamber, said forked extremity providing a recess wider than the thickness of the plate, a pin extending between said forks and a hole in said plate, the hole in said plate being larger than said pin, permitting limited movement of said plate toward and away from one of said outlets to align the imperforate section with said one outlet when liquid is introduced through said inlet, means in said upper chamber urging said plate to a position wherein said aperture is aligned with said one outlet, and a low pressure seal surrounding said stem whereby flow through said lower chamber holds said plate in the desired position.

8. In a diverter valve the combination of: a vertically extending valve housing having a relatively unobstructed lower chamber and an upper chamber connected with the lower chamber, said lower chamber having an inlet and a pair of outlets, a flat plate having an imperforate section and a section having an aperture therethrough, a stem in said upper chamber having a forked lower extremity in axial alignment with the longitudinal axis of the plate, a pin extending between said forks and a hole in said plate, the hole in said plate being larger than said pin and the space between said forks being wider than the thickness of the plate, permitting limited movement of said plate toward and away from one of said outlets to align the imperforate section with said one outlet when liquid is introduced through said inlet, means in the upper chamber urging said plate to a position wherein said aperture is aligned with said outlet, said one outlet being larger than said inlet and adjacent to and axially aligned therewith so that flow through same creates a zone of reduced pressure preventing flow through the second outlet, and a low pressure seal surrounding said stem whereby flow through said housing holds said plate in the desired position.

References Cited in the file of this patent

UNITED STATES PATENTS

| | | |
|---|---|---|
| 1,181,702 | Vaughn | May 2, 1916 |
| 1,924,771 | Brown | Aug. 29, 1933 |
| 2,022,875 | Zinkel | Dec. 3, 1935 |
| 2,473,267 | Wightman | June 14, 1949 |
| 2,663,539 | Kersten | Dec. 22, 1953 |
| 2,673,572 | Hartmann | Mar. 30, 1954 |
| 2,700,561 | Svenson | Jan. 25, 1955 |
| 2,767,019 | Manville | Oct. 16, 1956 |
| 2,786,644 | Koppl | Mar. 26, 1957 |
| 2,835,468 | Sparks | May 20, 1958 |